US011081687B2

(12) United States Patent
Natsui et al.

(10) Patent No.: US 11,081,687 B2
(45) Date of Patent: Aug. 3, 2021

(54) POSITIVE-ELECTRODE ACTIVE MATERIAL AND BATTERY INCLUDING POSITIVE-ELECTRODE ACTIVE MATERIAL

(71) Applicant: Panasonic Intellectual Property Management Co., Ltd., Osaka (JP)

(72) Inventors: Ryuichi Natsui, Osaka (JP); Junko Matsushita, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 178 days.

(21) Appl. No.: 16/293,577

(22) Filed: Mar. 5, 2019

(65) Prior Publication Data

US 2019/0198861 A1    Jun. 27, 2019

Related U.S. Application Data

(63) Continuation of application No. PCT/JP2017/026210, filed on Jul. 20, 2017.

(30) Foreign Application Priority Data

Dec. 2, 2016  (JP) .............................. JP2016-234666

(51) Int. Cl.
| | |
|---|---|
| *H01M 4/1315* | (2010.01) |
| *H01M 4/505* | (2010.01) |
| *H01M 10/0525* | (2010.01) |
| *H01M 4/525* | (2010.01) |
| *H01M 10/0562* | (2010.01) |
| *C01B 33/00* | (2006.01) |
| *C01G 45/00* | (2006.01) |
| *C01B 35/00* | (2006.01) |
| *H01M 10/052* | (2010.01) |
| *H01M 10/0566* | (2010.01) |
| *H01M 10/0565* | (2010.01) |
| *H01M 4/02* | (2006.01) |

(52) U.S. Cl.
CPC ........... *H01M 4/1315* (2013.01); *C01B 33/00* (2013.01); *C01B 35/00* (2013.01); *C01G 45/006* (2013.01); *H01M 4/505* (2013.01); *H01M 4/525* (2013.01); *H01M 10/052* (2013.01); *H01M 10/0525* (2013.01); *H01M 10/0562* (2013.01); *H01M 10/0565* (2013.01); *H01M 10/0566* (2013.01); *C01P 2002/76* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 6,037,095 A | 3/2000 | Miyasaka | |
| 6,416,902 B1 | 7/2002 | Miyasaka | |
| 6,872,491 B2 | 3/2005 | Kanai et al. | |
| 7,429,434 B2 | 9/2008 | Mihara et al. | |
| 8,741,484 B2 | 6/2014 | Karthikeyan et al. | |
| 9,178,249 B2 | 11/2015 | Amine et al. | |
| 2002/0022183 A1 | 2/2002 | Ogawa et al. | |
| 2002/0055042 A1 | 5/2002 | Kweon et al. | |
| 2004/0202938 A1 | 10/2004 | Noguchi et al. | |
| 2004/0229123 A1 | 11/2004 | Takahashi et al. | |
| 2005/0084757 A1 | 4/2005 | Kweon et al. | |
| 2009/0136854 A1 | 5/2009 | Nakura | |
| 2009/0202892 A1 | 8/2009 | Inagaki et al. | |
| 2010/0086854 A1 | 4/2010 | Kumar et al. | |
| 2011/0247321 A1 | 10/2011 | Streeter et al. | |
| 2011/0294019 A1 | 12/2011 | Amine et al. | |
| 2013/0136987 A1 | 5/2013 | Uehara et al. | |
| 2013/0209871 A1 | 8/2013 | Kato et al. | |
| 2013/0266868 A1 | 10/2013 | Sun et al. | |
| 2014/0099549 A1 | 4/2014 | Ceder et al. | |
| 2014/0127583 A1 | 5/2014 | Han et al. | |
| 2014/0162127 A1 | 6/2014 | Kim et al. | |
| 2014/0205913 A1 | 7/2014 | Park et al. | |
| 2014/0272607 A1 | 9/2014 | Amine et al. | |
| 2015/0010819 A1 | 1/2015 | Lee et al. | |
| 2015/0090924 A1 | 4/2015 | Lee et al. | |
| 2015/0093646 A1 | 4/2015 | Kawada | |
| 2015/0214550 A1 | 7/2015 | Song et al. | |
| 2015/0228970 A1 | 8/2015 | Song et al. | |
| 2015/0380768 A1 | 12/2015 | Mizuno et al. | |
| 2016/0013517 A1 | 1/2016 | Nakazawa et al. | |
| 2016/0049640 A1 | 2/2016 | Takeuchi et al. | |
| 2016/0372747 A1 | 12/2016 | Rolff et al. | |
| 2017/0005332 A1 | 1/2017 | Chen et al. | |
| 2017/0207444 A1 | 7/2017 | Yanagihara et al. | |
| 2019/0088940 A1 | 3/2019 | Ceder et al. | |

FOREIGN PATENT DOCUMENTS

| | | |
|---|---|---|
| CN | 103928672 A | 7/2014 |
| EP | 2921455 A1 | 9/2015 |

(Continued)

OTHER PUBLICATIONS

International Search Report of PCT application No. PCT/JP2017/026210 dated Oct. 17, 2017.

(Continued)

*Primary Examiner* — Laura Weiner
(74) *Attorney, Agent, or Firm* — McDermott Will and Emery LLP

(57) ABSTRACT

A positive-electrode active material contains a compound represented by the following composition formula (1):

$$Li_xMe_yA_zO_\alpha F_\beta \qquad (1)$$

where Me denotes one or more elements selected from the group consisting of Mn, Co, Ni, Fe, Al, Cu, Nb, Mo, Ti, Cr, Zr, Zn, Na, K, Ca, Mg, Pt, Au, Ru, and W, A denotes one or more elements selected from the group consisting of B, Si, and P, and the following conditions: $1.3 \leq x \leq 2.1$, $0.8 \leq y \leq 1.3$, $0 < z \leq 0.2$, $1.8 \leq \alpha \leq 2.9$, and $0.1 \leq \beta \leq 1.2$ are satisfied. A crystal structure of the compound belongs to a space group Fm-3m.

11 Claims, 2 Drawing Sheets

(56) References Cited

FOREIGN PATENT DOCUMENTS

| | | |
|---|---|---|
| JP | H01-209663 A | 8/1989 |
| JP | 7-037617 | 2/1995 |
| JP | H09-330720 A | 12/1997 |
| JP | 10-294100 | 11/1998 |
| JP | 10-302768 | 11/1998 |
| JP | 10-326621 | 12/1998 |
| JP | 11-345615 | 12/1999 |
| JP | H11-339800 A | 12/1999 |
| JP | 2000-012031 A | 1/2000 |
| JP | 2000-260433 A | 9/2000 |
| JP | 2001-516492 A | 9/2001 |
| JP | 2002-015776 A | 1/2002 |
| JP | 2003-229130 A | 8/2003 |
| JP | 3578066 B2 | 10/2004 |
| JP | 2004-311408 A | 11/2004 |
| JP | 2004-349132 A | 12/2004 |
| JP | 2005-063953 A | 3/2005 |
| JP | 2006-261127 | 9/2006 |
| JP | 2006-278341 | 10/2006 |
| JP | 2007-018874 A | 1/2007 |
| JP | 2008-124038 | 5/2008 |
| JP | 2009-187834 A | 8/2009 |
| JP | 2011-018656 A | 1/2011 |
| JP | 2012-014851 A | 1/2012 |
| JP | 2012-038564 | 2/2012 |
| JP | 2012-156046 A | 8/2012 |
| JP | 2013-222612 A | 10/2013 |
| JP | 2014-022191 A | 2/2014 |
| JP | 2014-116308 A | 6/2014 |
| JP | 2015-022958 A | 2/2015 |
| JP | 2015-069754 A | 4/2015 |
| JP | 2015-111551 A | 6/2015 |
| JP | 2015-118892 A | 6/2015 |
| JP | 2015-128023 A | 7/2015 |
| JP | 2015-159109 A | 9/2015 |
| JP | 2016-033902 A | 3/2016 |
| KR | 2001-018401 * | 3/2001 |
| KR | 2001-045712 * | 6/2001 |
| WO | 1997/044842 A1 | 11/1997 |
| WO | 2012/014846 A1 | 2/2012 |
| WO | 2012/086602 A1 | 6/2012 |
| WO | 2012/176267 A1 | 12/2012 |
| WO | 2014/126256 A1 | 8/2014 |
| WO | 2014/156153 A1 | 10/2014 |
| WO | 2014/157591 A1 | 10/2014 |

OTHER PUBLICATIONS

Shuhua Ren et al., Improved Voltage and Cycling for Intercalation in High-Capacity Disordered Oxyfluoride Cathodes, Advanced Science, Jun. 12, 2015, vol. 2, Issue 10, 1500128.
ICSD Details on Search Result for Li2 (Mn O3), printed on Feb. 4, 2020.
Coban, Hüseyin Can Çoban, "Metal Oxide (SnO2) Modified LiNi0.8Co0.2O2 Cathode Material for Lithium Ion Batteries," M.Sc. Thesis, Department of Nano Science and Nano Engineering, Nano Science and Nano Engineering Programme, Istanbul Technical University Graduate School of Science Engineering and Technology. May 2014.
The Extended European Search Report dated Jun. 1, 2018 for the related European Patent Application No. 16827416.5.
Ayuko Kitajou et al: "Electrochemical Performance of a Novel Cathode material "LiFeOF" for Li-ion Batteries", Electrochemistry, vol. 83, No. 10, Jan. 1, 2015 (Jan. 1, 2015), pp. 885-888, XP055416459.
International Search Report of PCT application No. PCT/JP2016/003215 dated Sep. 20, 2016.
International Search Report of PCT application No. PCT/JP2017/027997 dated Sep. 26, 2017.
International Search Report of PCT application No. PCT/JP2016/003954 dated Dec. 6, 2016.
International Search Report of PCT application No. PCT/JP2016/003949 dated Nov. 29, 2016.
International Search Report of PCT application No. PCT/JP2016/003955 dated Dec. 6, 2016.
International Search Report of PCT application No. PCT/JP2016/003948 dated Nov. 29, 2016.
International Search Report of PCT application No. PCT/JP2016/003952 dated Nov. 1, 2016.
International Search Report of PCT application No. PCT/JP2016/003953 dated Dec. 6, 2016.
International Search Report of PCT application No. PCT/JP2016/003951 dated Nov. 1, 2016.
International Search Report of PCT application No. PCT/JP2016/003950 dated Nov. 29, 2016.
M. Holzapfel et al., "Lithium-Ion Conductors of the System LiCo1-xFexO2, Preparation and Structural Investigation," Journal of Solid State Chemistry, 2001, 156, pp. 470-479.
S. Muhammad et al., "Deciphering the thermal behavior of lithium rich cathode material by in situ X-ray diffraction technique," Journal of Power Sources, 2015, 285, pp. 156-160.
International Search Report of PCT application No. PCT/JP2016/003956 dated Dec. 6, 2016.
Non-Final Office Action issued in U.S. Appl. No. 15/821,749, dated Jan. 16, 2020.
Notice of Allowance issued in U.S. Appl. No. 15/821,749, dated Apr. 15, 2020.
Non-Final Office Action issued in U.S. Appl. No. 15/821,745, dated Dec. 10, 2019.
Notice of Allowance issued in U.S. Appl. No. 15/821,745, dated Apr. 8, 2020.
Non-Final Office Action issued in U.S. Appl. No. 15/813,210, dated Jan. 2, 2020.
Non-Final Office Action issued in U.S. Appl. No. 15/813,204, dated Dec. 17, 2019.
Notice of Allowance issued in U.S. Appl. No. 15/813,204, dated Apr. 9, 2020.
Non-Final Office Action issued in U.S. Appl. No. 15/814,874, dated Jan. 2, 2020.
Non-Final Office Action issued in U.S. Appl. No. 15/811,685, dated Dec. 3, 2019.
Notice of Allowance issued in U.S. Appl. No. 15/811,685, dated Apr. 9, 2020.
Non-Final Office Action issued in U.S. Appl. No. 16/278,701, dated Aug. 27, 2019.
Non-Final Office Action issued in U.S. Appl. No. 16/278,701, dated Dec. 10, 2019.
Final Office Action issued in U.S. Appl. No. 16/278,701, dated Apr. 16, 2020.
Non-Final Office Action issued in U.S. Appl. No. 15/813,212, dated Dec. 31, 2019.
Non-Final Office Action issued in U.S. Appl. No. 15/811,683, dated Nov. 15, 2018.
Final Office Action issued in U.S. Appl. No. 15/811,683, dated Apr. 18, 2019.
Notice of Allowance issued in U.S. Appl. No. 15/811,683, dated Aug. 19, 2019.
Non-Final Office Action issued in U.S. Appl. No. 15/811,684, dated Dec. 5, 2019.
Final Office Action issued in U.S. Appl. No. 15/811,684, dated Mar. 13, 2020.
Notice of Allowance issued in U.S. Appl. No. 15/811,684, dated Apr. 8, 2020.
Non-Final Office Action issued in U.S. Appl. No. 15/838,360, dated Feb. 10, 2020.
Non-Final Office Action issued in U.S. Appl. No. 15/844,626, dated Mar. 18, 2020.
Non-Final Office Action issued in U.S. Appl. No. 15/813,218, dated Jan. 16, 2020.
Non-Final Office Action issued in U.S. Appl. No. 15/702,632, dated Jun. 17, 2019.
Non-Final Office Action issued in U.S. Appl. No. 15/702,632, dated Nov. 26, 2019.
Final Office Action issued in U.S. Appl. No. 15/702,632, dated Aug. 23, 2019.

(56) References Cited

OTHER PUBLICATIONS

Non-Final Office Action issued in U.S. Appl. No. 15/838,360, dated Apr. 22, 2020.
Notice of Allowance issued in U.S. Appl. No. 15/702,632, dated Apr. 20, 2020.
Notice of Allowance issued in U.S. Appl. No. 15/813,210, dated Apr. 22, 2020.
Notice of Allowance issued in U.S. Appl. No. 15/813,218, dated May 4, 2020.
Notice of Allowance issued in U.S. Appl. No. 15/813,212, dated May 1, 2020.
Notice of Allowance issued in U.S. Appl. No. 15/814,874, dated May 1, 2020.
English Translation of Chinese Search Report dated Jul. 13, 2020 for the related Chinese Patent Application No. 201680013989.7.
Synthesis and electrochemistry of cubic rocksalt Li—Ni—Ti—O compounds in the phase diagram of $LiNiO_2$—$LiTiO_2$—$Li[Li1/3Ti2/3]O2$, Lianqi Zhang, et al Journal of power Sourses, 185(2008), p. 534-p. 541.
Written Opinion for Japanese Patent Application No. 2017-540475, dated Sep. 1, 2020; with English translation.

* cited by examiner

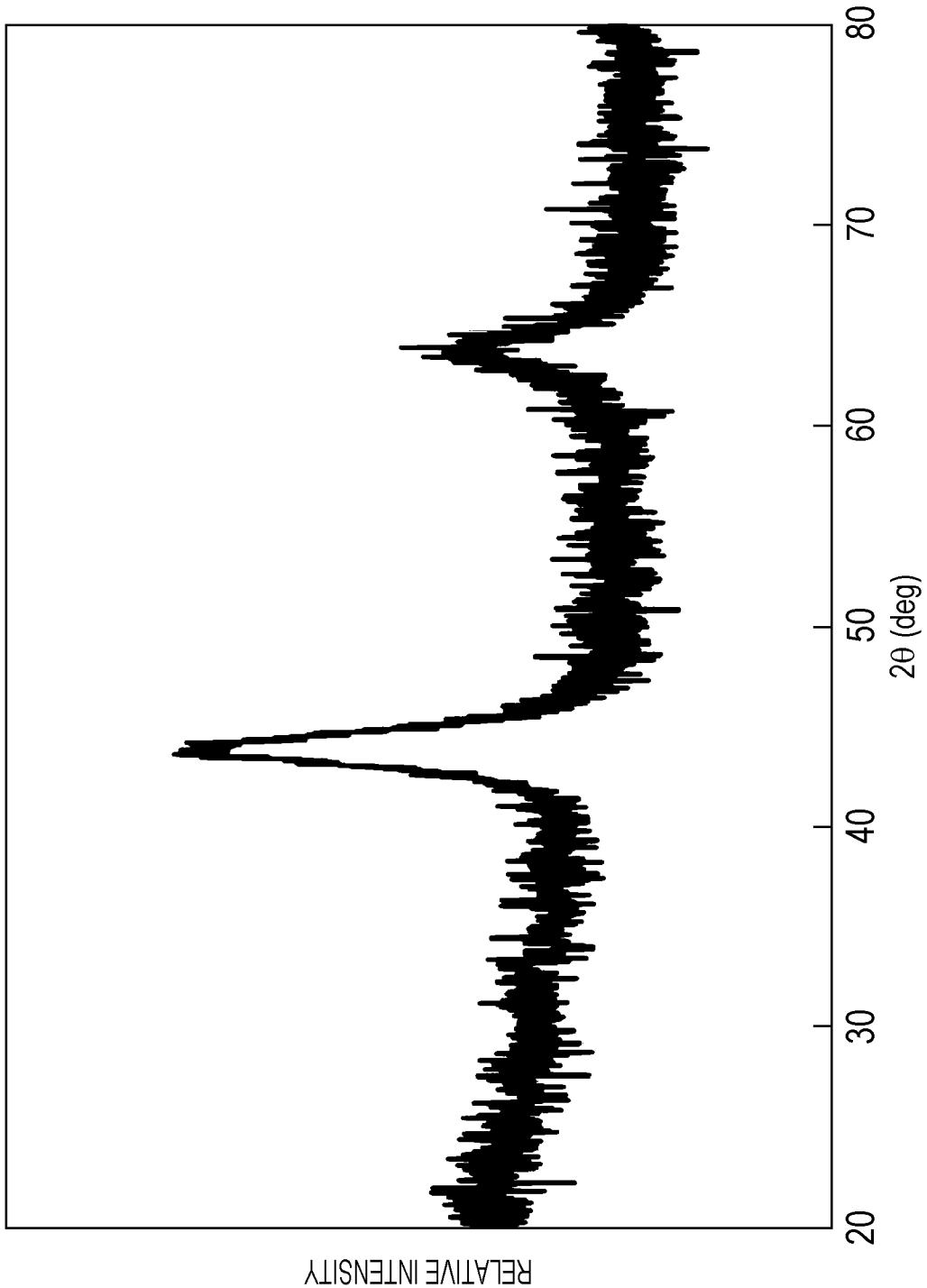

POSITIVE-ELECTRODE ACTIVE MATERIAL AND BATTERY INCLUDING POSITIVE-ELECTRODE ACTIVE MATERIAL

BACKGROUND

1. Technical Field

The present disclosure relates to a positive-electrode active material and a battery including the positive-electrode active material.

2. Description of the Related Art

Japanese Unexamined Patent Application Publication No. 7-037617 discloses a positive-electrode active material that has a crystal structure belonging to the space group R-3m and is represented by the formula $Li_wM_xO_yX_z$ (M denotes Co, Ni, Mn, V, Fe, or Ti, X denotes at least one halogen element, and $0.2 \leq w \leq 2.5$, $0.8 \leq x \leq 1.25$, $1 \leq y \leq 2$, and $0 \leq z \leq 1$ are satisfied).

SUMMARY

One non-limiting and exemplary embodiment provides a high-capacity battery.

In one general aspect, the techniques disclosed here feature a positive-electrode active material according to one aspect of the present disclosure contains a compound represented by the following composition formula (1):

$$Li_xMe_yA_zO_\alpha F_\beta \quad (1)$$

where Me denotes one or more elements selected from the group consisting of Mn, Co, Ni, Fe, Al, Cu, Nb, Mo, Ti, Cr, Zr, Zn, Na, K, Ca, Mg, Pt, Au, Ru, and W, and A denotes one or more elements selected from the group consisting of B, Si, and P. A crystal structure of the compound belongs to a space group Fm-3m.

The following conditions: $1.3 \leq x \leq 2.1$, $0.8 \leq y \leq 1.3$, $0 \leq z \leq 0.2$, $1.8 \leq \alpha \leq 2.9$, and $0.1 \leq \beta \leq 1.2$ are satisfied.

The present disclosure can provide a high-capacity battery.

It should be noted that general or specific aspects of the present disclosure may be implemented as a positive-electrode active material, a battery, a method, or any combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is an X-ray powder diffraction chart of a positive-electrode active material according to Example 1.

DETAILED DESCRIPTION

Figure 1:
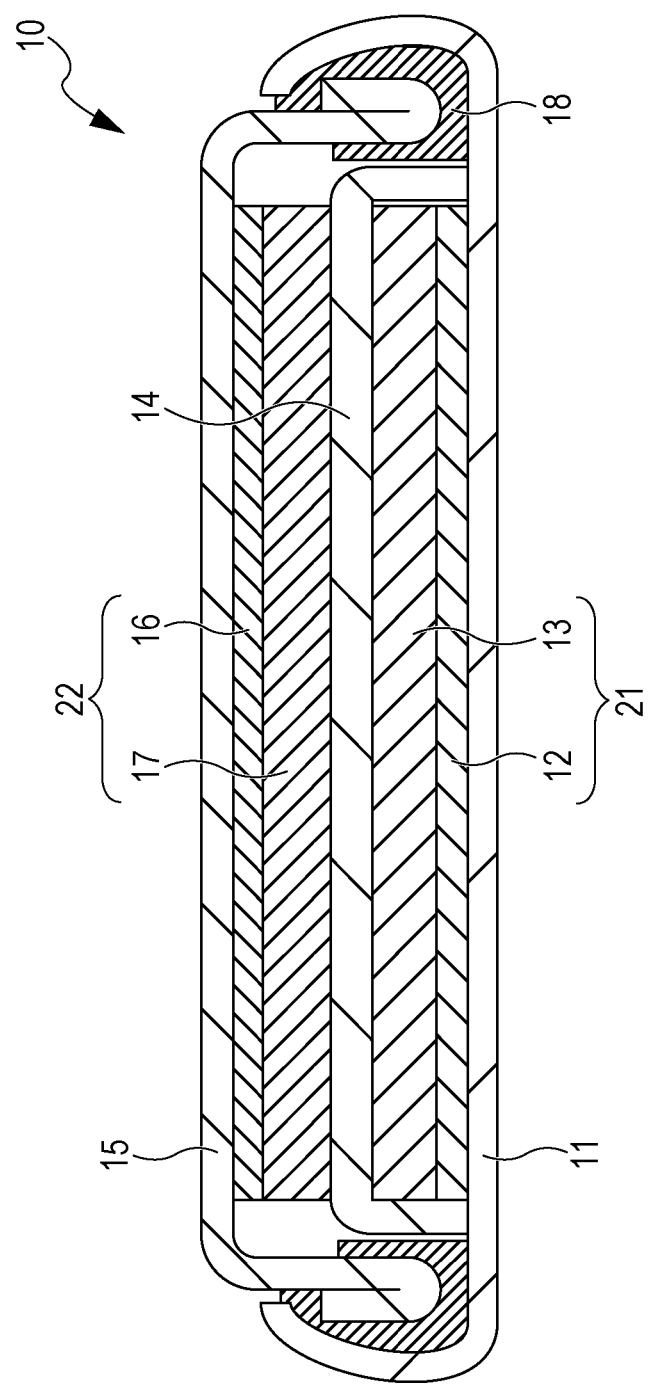
FIG. 1 is a schematic cross-sectional view of a battery according to a second embodiment.

Embodiments of the present disclosure will be described below.

First Embodiment

A positive-electrode active material according to a first embodiment contains a compound that has a crystal structure belonging to the space group Fm-3m and that is represented by the following composition formula (1):

$$Li_xMe_yA_zO_\alpha F_\beta \quad (1)$$

where Me denotes one or two or more elements selected from the group consisting of Mn, Co, Ni, Fe, Al, Cu, Nb, Mo, Ti, Cr, Zr, Zn, Na, K, Ca, Mg, Pt, Au, Ru, and W.

A denotes one or two or more elements selected from the group consisting of B, Si, and P.

In the positive-electrode active material according to the first embodiment, the compound satisfies the following conditions: $1.3 \leq x \leq 2.1$, $0.8 \leq y \leq 1.3$, $0 < z \leq 0.2$, $1.8 \leq \alpha \leq 2.9$, and $0.1 \leq \beta \leq 1.2$ in the composition formula (1).

Such an embodiment can provide a high-capacity battery.

For example, a lithium-ion battery including a positive-electrode active material containing the compound has an oxidation-reduction potential of approximately 3.3 V (vs. Li/Li$^+$). The lithium-ion battery has a capacity of approximately 220 mAh/g or more.

In the composition formula (1), A denotes one or two or more elements selected from the group consisting of B, Si, and P. These highly covalent elements can improve the operating voltage. These elements also have a small atomic weight. Thus, the positive-electrode active material according to the first embodiment can be used to manufacture a high-capacity battery.

These highly covalent elements can stabilize the structure and improve the cycle characteristics. This results in a longer-life battery.

In the first embodiment, if A denotes two or more elements (for example, A' and A") with a component ratio of "$A'_{z1}A''_{z2}$", then "$z = z1 + z2$". For example, if A denotes two or more elements (B and P) with a component ratio of "$B_{0.1}P_{0.05}$", then "$z = 0.1 + 0.05 = 0.15$".

In the composition formula (1), the compound contains F. The substitution of electronegative F for oxygen improves the discharge capacity or operating voltage. Substitution with F, which has a small ionic radius, decreases the interatomic distance and stabilizes the structure. Thus, the positive-electrode active material according to the first embodiment can be used to manufacture a high-capacity battery.

In the composition formula (1) of the compound, x of less than 1.3 results in a decreased amount of available Li. This results in insufficient capacity.

In the composition formula (1) of the compound, x of more than 2.1 results in a decrease in an oxidation-reduction reaction of available Me. This results in increased utilization of an oxidation-reduction reaction of oxygen. This destabilizes the crystal structure. This results in insufficient capacity.

In the composition formula (1) of the compound, y of less than 0.8 results in a decrease in an oxidation-reduction reaction of available Me. This results in increased utilization of an oxidation-reduction reaction of oxygen. This destabilizes the crystal structure. This results in insufficient capacity.

In the composition formula (1) of the compound, y of greater than 1.3 results in a decreased amount of available Li. This results in insufficient capacity.

In the composition formula (1) of the compound, z of 0 results in a decreased operating voltage due to the absence of highly covalent typical elements. This results in insufficient capacity. This also destabilizes the structure upon Li deintercalation. This results in poor cycle characteristics.

In the composition formula (1) of the compound, z of more than 0.2 results in an increase in the amount of typical element that is not involved in an oxidation-reduction reaction. This results in insufficient capacity.

In the composition formula (1) of the compound, a of less than 1.8 results in a decrease in the amount of charge compensation due to oxidation-reduction of oxygen. This results in insufficient capacity.

In the composition formula (1) of the compound, a of more than 2.9 results in excess capacity due to oxidation-reduction of oxygen and results in destabilization of the structure upon Li deintercalation. This results in insufficient capacity.

In the composition formula (1) of the compound, 3 of less than 0.1 results in a decrease in cation-anion interaction due to a decrease in the effects of electronegative F. This destabilizes the structure upon Li deintercalation. This results in insufficient capacity.

In the composition formula (1) of the compound, 3 of more than 1.2 results in a decrease in electronic conductivity due to enhanced effects of electronegative F. This results in insufficient capacity.

In the positive-electrode active material according to the first embodiment, a compound represented by the composition formula (1) has a crystal structure belonging to the space group Fm-3m (that is, a rock-salt-type crystal structure).

In the positive-electrode active material according to the first embodiment, Li, Me, and A in a compound represented by the composition formula (1) are probably located at the same site.

In the composition formula (1), the ratio of "Li" to "Me+A" is represented by $x/(y+z)$.

In the composition formula (1) of the compound, $1 \leq x/(y+z) \leq 2.33$ may be satisfied.

Such an embodiment can provide a higher-capacity battery.

$x/(y+z)$ of 1 or more results in an increased number of Li atoms at the Li site compared with a known positive-electrode active material, for example, represented by the composition formula $LiMnO_2$. This allows more Li to be intercalated and deintercalated.

$x/(y+z)$ of 2.33 or less can result in a smaller decrease in an oxidation-reduction reaction of Me. This obviates the need to increase the utilization of an oxidation-reduction reaction of oxygen. This can suppress the destabilization of the crystal structure upon Li deintercalation during charging and improves Li intercalation efficiency during discharging.

However, for example, a layered structure specified by the space group R-3m cannot hold the layers and disintegrates upon abstraction of much Li.

By contrast, a cubic rock-salt-type crystal structure specified by the space group Fm-3m, such as the positive-electrode active material according to the first embodiment, can stably maintain the structure without disintegration, even after abstraction of much Li. In a cubic rock-salt-type crystal structure specified by the space group Fm-3m, elements with different ionic radii may mix together easily. For these reasons, the positive-electrode active material according to the first embodiment is suitable for high-capacity batteries.

In the composition formula (1) of the compound, $1.12 \leq x/(y+z) \leq 2.33$ may be satisfied.

Such an embodiment can provide a higher-capacity battery.

In the composition formula (1), the ratio of "Li+Me+A" to "O+F" (that is, the ratio of "cation" to "anion") is represented by $(x+y+z)/(\alpha+\beta)$.

In the composition formula (1) of the compound, $0.8 \leq (x+y+z)/(\alpha+\beta) \leq 1$ may be satisfied.

Such an embodiment can provide a higher-capacity battery.

$(x+y+z)/(\alpha+\beta)$ of 0.8 or more results in suppression of phase separation to form impurities during synthesis. This results in sufficient capacity.

$(x+y+z)/(\alpha+\beta)$ of 1 or less results in stabilization of the crystal structure upon Li deintercalation during charging due to no deficiency of anions, thus resulting in a smaller decrease in Li intercalation efficiency during discharging. This results in sufficient capacity.

$(x+y+z)/(\alpha+\beta)$ of less than 1 results in the formation of a cation-deficient structure and more Li diffusion paths, which results in a high-capacity battery.

In the composition formula (1) of the compound, $2.6/3 \leq (x+y+z)/(\alpha+\beta) \leq 2.9/3$ may be satisfied.

Such an embodiment can provide a higher-capacity battery.

In the composition formula (1) of the compound, Me may be one element selected from the group consisting of Mn, Co, Ni, and Fe, or a solid solution of Mn and one element selected from the group consisting of Co, Ni, Al, Cu, Nb, Mo, Ti, Cr, Zr, Zn, Na, and Mg, or a solid solution of Ni, Co, and Mn.

Such an embodiment can provide a higher-capacity battery.

In the composition formula (1) of the compound, A may be one element selected from the group consisting of B, Si, and P, or a solid solution of B and P.

Such an embodiment can provide a higher-capacity battery.

In the composition formula (1) of the compound, $0.05 \leq z \leq 0.2$ may be satisfied.

Such an embodiment can provide a higher-capacity battery. Such an embodiment also further stabilizes the structure and improves the cycle characteristics.

In the composition formula (1) of the compound, $1.8 \leq \alpha \leq 2.5$ and $0.5 \leq \beta \leq 1.2$ may be satisfied.

Such an embodiment can provide a higher-capacity battery. Such a battery also has better cycle characteristics. In the composition formula (1) of the compound, β of 0.5 or more (that is, a sufficiently high fluorine content) can result in suppression of an increase in the amount of oxygen involved in a redox reaction. This can suppress the destabilization of the structure due to oxygen desorption. This improves the cycle characteristics.

The positive-electrode active material according to the first embodiment may contain the compound as a main component (that is, the weight ratio of the compound to the positive-electrode active material is 50% or more (50% or more by weight)).

Such an embodiment can provide a higher-capacity battery.

The compound may constitute 70% or more of the positive-electrode active material according to the first embodiment on a weight basis (70% or more by weight).

Such an embodiment can provide a higher-capacity battery.

The compound may constitute 90% or more of the positive-electrode active material according to the first embodiment on a weight basis (90% or more by weight).

Such an embodiment can provide a higher-capacity battery.

The positive-electrode active material according to the first embodiment may contain incidental impurities in addition to the compound.

The positive-electrode active material according to the first embodiment may contain at least one selected from the group consisting of the starting materials for the synthesis of the compound, by-products, and degradation products, in addition to the compound.

The compound may constitute 100% by weight of the positive-electrode active material according to the first embodiment except incidental impurities.

Such an embodiment can provide a higher-capacity battery.

<Method for Producing Compound>

An exemplary method for producing the compound of the positive-electrode active material according to the first embodiment will be described below.

A compound represented by the composition formula (1) can be produced by the following method, for example.

A raw material containing Li, a raw material containing F, a raw material containing Me, and a raw material containing A are prepared.

Examples of the raw material containing Li include oxides, such as $Li_2O$ and $Li_2O_2$, salts, such as LiF, $Li_2CO_3$, and LiOH, and lithium composite oxides, such as $LiMeO_2$ and $LiMe_2O_4$.

Examples of the raw material containing F include LiF and metal fluorides.

Examples of the raw material containing Me include oxides in various oxidation states, such as $Me_2O_3$, salts, such as $MeCO_3$ and $MeNO_3$, hydroxides, such as $Me(OH)_2$ and MeOOH, and lithium composite oxides, such as $LiMeO_2$ and $LiMe_2O_4$.

In the case that Me is Mn, examples of the raw material containing Mn include manganese oxides in various oxidation states, such as $MnO_2$ and $Mn_2O_3$, salts, such as $MnCO_3$ and $MnNO_3$, hydroxides, such as $Mn(OH)_2$ and MnOOH, and lithium composite oxides, such as $LiMnO_2$ and $LiMn_2O_4$.

Examples of the raw material containing A include $Li_4AO_4$, $Li_3AO_4$, $LiAO_2$, oxides in various oxidation states, lithium composite oxides, and salts, such as $AO_4$.

These raw materials are weighed at the mole ratio of the composition formula (1).

The variables "x, y, z, a, and 13" in the composition formula (1) can be altered in the ranges described for the composition formula (1).

The weighed raw materials are mixed, for example, by a dry process or a wet process and are allowed to react mechanochemically for 10 hours or more to produce a compound represented by the composition formula (1). For example, a mixing apparatus, such as a ball mill, may be used.

The raw materials and the conditions for mixing a mixture of the raw materials can be adjusted to produce a compound substantially represented by the composition formula (1).

The use of a lithium composite transition metal oxide as a precursor can decrease the energy for mixing elements. Thus, a compound represented by the composition formula (1) can be produced with higher purity.

The composition of a compound represented by the composition formula (1) thus produced can be determined by ICP spectroscopy and an inert gas fusion-infrared absorption method, for example.

A compound represented by the composition formula (1) can be identified by determining the space group of the crystal structure by powder X-ray analysis.

Thus, a method for producing a positive-electrode active material according to one aspect of the first embodiment includes (a) a step of preparing the raw materials and (b) a step of mechanochemically reacting the raw materials to produce the positive-electrode active material.

The step (a) may include a step of mixing the raw materials at a Li/(Me+A) mole ratio in the range of 1.0 to 2.33 to prepare a raw material mixture.

The step (a) may include a step of producing a raw material, a lithium composite oxide, by a known method.

The step (a) may include a step of mixing the raw materials at a Li/(Me+A) mole ratio in the range of 1.12 to 2.33 to prepare a raw material mixture.

The step (b) may include a step of mechanochemically reacting the raw materials in a ball mill.

Thus, a compound represented by the composition formula (1) may be synthesized by mechanochemically reacting a precursor (for example, LiF, $Li_2O$, a metal oxide, a lithium composite oxide, etc.) in a planetary ball mill.

The mixing ratio of the precursor can be adjusted to introduce more Li atoms.

When the precursor is reacted by a solid phase method, the precursor is decomposed into more stable compounds.

Thus, a compound that has a crystal structure belonging to the space group Fm-3m and is represented by the composition formula (1) cannot be produced by a method for reacting the precursor by a solid phase method.

Second Embodiment

A second embodiment will be described below. The contents described in the first embodiment are appropriately omitted to avoid overlap.

A battery according to the second embodiment includes a positive electrode containing the positive-electrode active material according to the first embodiment, a negative electrode, and an electrolyte.

Such an embodiment can provide a high-capacity battery.

In the battery according to the second embodiment, the positive electrode may have a positive-electrode active material layer. The positive-electrode active material layer may contain the positive-electrode active material according to the first embodiment as a main component (that is, the weight ratio of the positive-electrode active material to the positive-electrode active material layer is 50% or more (50% or more by weight)).

Such an embodiment can provide a higher-capacity battery.

Alternatively, the positive-electrode active material layer in the battery according to the second embodiment may contain the positive-electrode active material according to the first embodiment constituting 70% or more of the positive-electrode active material layer on a weight basis (70% or more by weight).

Such an embodiment can provide a higher-capacity battery.

Alternatively, the positive-electrode active material layer in the battery according to the second embodiment may contain the positive-electrode active material according to the first embodiment constituting 90% or more of the positive-electrode active material layer on a weight basis (90% or more by weight).

Such an embodiment can provide a higher-capacity battery.

The battery according to the second embodiment may be a lithium-ion secondary battery, a non-aqueous electrolyte secondary battery, or an all-solid-state battery, for example.

In the battery according to the second embodiment, the negative electrode may contain a negative-electrode active material that stores and releases lithium, for example.

In the battery according to the second embodiment, for example, the electrolyte may be a non-aqueous electrolyte (for example, a non-aqueous electrolyte solution).

In the battery according to the second embodiment, the electrolyte may be a solid electrolyte, for example.

FIG. 1 is a schematic cross-sectional view of a battery 10 according to the second embodiment.

As illustrated in FIG. 1, the battery 10 includes a positive electrode 21, a negative electrode 22, a separator 14, a case 11, a sealing plate 15, and a gasket 18.

The separator 14 is disposed between the positive electrode 21 and the negative electrode 22.

The positive electrode 21, the negative electrode 22, and the separator 14 are impregnated with a non-aqueous electrolyte (for example, a non-aqueous electrolyte solution), for example.

The positive electrode 21, the negative electrode 22, and the separator 14 constitute an electrode group.

The electrode group is housed in the case 11.

The case 11 is sealed with the gasket 18 and the sealing plate 15.

The positive electrode 21 includes a positive-electrode current collector 12 and a positive-electrode active material layer 13 disposed on the positive-electrode current collector 12.

The positive-electrode current collector 12 is formed of a metallic material (aluminum, stainless steel, an aluminum alloy, etc.), for example.

The positive-electrode current collector 12 may be omitted, and the case 11 may be used as a positive-electrode current collector.

The positive-electrode active material layer 13 contains the positive-electrode active material according to the first embodiment.

If necessary, the positive-electrode active material layer 13 may contain an additive agent (an electrically conductive agent, an ionic conduction aid, a binder, etc.).

The negative electrode 22 includes a negative-electrode current collector 16 and a negative-electrode active material layer 17 disposed on the negative-electrode current collector 16.

The negative-electrode current collector 16 is formed of a metallic material (aluminum, stainless steel, an aluminum alloy, etc.), for example.

The negative-electrode current collector 16 may be omitted, and the sealing plate 15 may be used as a negative-electrode current collector.

The negative-electrode active material layer 17 contains a negative-electrode active material.

If necessary, the negative-electrode active material layer 17 may contain an additive agent (an electrically conductive agent, an ionic conduction aid, a binder, etc.).

The negative-electrode active material may be a metallic material, carbon material, oxide, nitride, tin compound, or silicon compound.

The metallic material may be a single metal. Alternatively, the metallic material may be an alloy. Examples of the metallic material include lithium metal and lithium alloys.

Examples of the carbon material include natural graphite, coke, carbon under graphitization, carbon fiber, spherical carbon, artificial graphite, and amorphous carbon.

From the perspective of capacity density, silicon (Si), tin (Sn), silicon compounds, and tin compounds can be used. Silicon compounds and tin compounds may be alloys and solid solutions.

Examples of the silicon compounds include $SiO_x$ (wherein $0.05 \leq x \leq 1.95$). Compounds (alloys and solid solutions) produced by substituting another element for part of silicon of $SiO_x$ may also be used. The other element may be at least one selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of the tin compound include $Ni_2Sn_4$, $Mg_2Sn$, $SnO_x$ (wherein $0<x<2$), $SnO_2$, and $SnSiO_3$. A tin compound selected from these compounds may be used alone. Alternatively, two or more tin compounds selected from these compounds may be used in combination.

The negative-electrode active material may have any shape. The negative-electrode active material may have a known shape (particulate, fibrous, etc.).

The negative-electrode active material layer 17 may be filled with (store) lithium by any method. More specifically, the method may be (a) a method of depositing lithium on the negative-electrode active material layer 17 by a gas phase method, such as a vacuum evaporation method, or (b) a method of heating a lithium metal foil in contact with the negative-electrode active material layer 17. In these methods, lithium can be diffused into the negative-electrode active material layer 17 by heat. Alternatively, lithium may be electrochemically stored on the negative-electrode active material layer 17. More specifically, a battery is assembled from the negative electrode 22 free of lithium and a lithium metal foil (positive electrode). Subsequently, the battery is charged to store lithium on the negative electrode 22.

Examples of the binder for the positive electrode 21 and the negative electrode 22 include poly(vinylidene difluoride), polytetrafluoroethylene, polyethylene, polypropylene, aramid resin, polyamide, polyimide, polyamideimide, polyacrylonitrile, poly(acrylic acid), poly(methyl acrylate), poly(ethyl acrylate), poly(hexyl acrylate), poly(methacrylic acid), poly(methyl methacrylate), poly(ethyl methacrylate), poly(hexyl methacrylate), poly(vinyl acetate), polyvinylpyrrolidone, polyether, polyethersulfone, hexafluoropolypropylene, styrene-butadiene rubber, and carboxymethylcellulose. Other examples of the binder include copolymers of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. The binder may also be a mixture of two or more materials selected from these materials.

Examples of the electrically conductive agent for the positive electrode 21 and the negative electrode 22 include graphite, carbon black, electrically conductive fiber, graphite fluoride, metal powders, electrically conductive whiskers, electrically conductive metal oxides, and electrically conductive organic materials. Examples of the graphite include natural graphite and artificial graphite. Examples of the carbon black include acetylene black, ketjen black (registered trademark), channel black, furnace black, lampblack, and thermal black. Examples of the metal powders include aluminum powders. Examples of the electrically conductive whiskers include zinc oxide whiskers and potassium titanate whiskers. Examples of the electrically conductive metal oxides include titanium oxide. Examples of the electrically conductive organic materials include phenylene derivatives.

The separator 14 may be formed of a material that has high ion permeability and sufficient mechanical strength. Examples of such a material include microporous thin films, woven fabrics, and nonwoven fabrics. More specifically, it is desirable that the separator 14 be formed of a polyolefin, such as polypropylene or polyethylene. The separator 14 formed of a polyolefin has not only good durability but also a shutdown function in case of excessive heating. The separator 14 has a thickness in the range of 10 to 300 µm (or 10 to 40 µm), for example. The separator 14 may be a monolayer film formed of one material. Alternatively, the separator 14 may be a composite film (or multilayer film) formed of two or more materials. The separator 14 has a porosity in the range of 30% to 70% (or 35% to 60%), for example. The term "porosity", as used herein, refers to the volume ratio of pores to the separator 14. The "porosity" is measured by a mercury intrusion method, for example.

The non-aqueous electrolyte solution contains a non-aqueous solvent and a lithium salt dissolved in the non-aqueous solvent.

Examples of the non-aqueous solvent include cyclic carbonate solvents, chain carbonate solvents, cyclic ether solvents, chain ether solvents, cyclic ester solvents, chain ester solvents, and fluorinated solvents.

Examples of the cyclic carbonate solvents include ethylene carbonate, propylene carbonate, and butylene carbonate.

Examples of the chain carbonate solvents include dimethyl carbonate, ethyl methyl carbonate, and diethyl carbonate.

Examples of the cyclic ether solvents include tetrahydrofuran, 1,4-dioxane, and 1,3-dioxolane.

Examples of the chain ether solvents include 1,2-dimethoxyethane and 1,2-diethoxyethane.

Examples of the cyclic ester solvent include γ-butyrolactone.

Examples of the chain ester solvents include methyl acetate.

Examples of the fluorinated solvents include fluoroethylene carbonate, methyl fluoropropionate, fluorobenzene, fluoroethyl methyl carbonate, and fluorodimethylene carbonate.

The non-aqueous solvent may be one non-aqueous solvent selected from these. Alternatively, the non-aqueous solvent may be a combination of two or more non-aqueous solvents selected from these.

The non-aqueous electrolyte solution may contain at least one fluorinated solvent selected from the group consisting of fluoroethylene carbonate, methyl fluoropropionate, fluorobenzene, fluoroethyl methyl carbonate, and fluorodimethylene carbonate.

These fluorinated solvents in the non-aqueous electrolyte solution improve the oxidation resistance of the non-aqueous electrolyte solution.

Consequently, even when the battery 10 is charged at a high voltage, the battery 10 can operate stably.

In the battery according to the second embodiment, the electrolyte may be a solid electrolyte.

Examples of the solid electrolyte include organic polymer solid electrolytes, oxide solid electrolytes, and sulfide solid electrolytes.

Examples of the organic polymer solid electrolytes include compounds of a polymer and a lithium salt.

The polymer may have an ethylene oxide structure. The ethylene oxide structure can increase the lithium salt content and ionic conductivity.

Examples of the oxide solid electrolytes include NASICON-type solid electrolytes, exemplified by $LiTi_2(PO_4)_3$ and element substitution products thereof, $(LaLi)TiO_3$ perovskite solid electrolytes, LISICON-type solid electrolytes, exemplified by $Li_{14}ZnGe_4O_{16}$, $Li_4SiO_4$, $LiGeO_4$, and element substitution products thereof, garnet solid electrolytes, exemplified by $Li_7La_3Zr_2O_{12}$ and element substitution products thereof, $Li_3N$ and H substitution products thereof, and $Li_3PO_4$ and N substitution products thereof.

Examples of the sulfide solid electrolytes include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. LiX (X: F, Cl, Br, or I), $MO_y$, or $Li_xMO_y$ (M: P, Si, Ge, B, Al, Ga, or In) (x, y: natural number) may be added to the sulfide solid electrolytes.

Among these, in particular, sulfide solid electrolytes have high formability and ionic conductivity. Thus, the use of sulfide solid electrolytes as solid electrolytes can achieve a battery with a higher energy density.

Among sulfide solid electrolytes, $Li_2S$—$P_2S_5$ has high electrochemical stability and higher ionic conductivity. Thus, the use of $Li_2S$—$P_2S_5$ as a solid electrolyte can achieve a battery with a higher energy density.

A solid electrolyte layer may contain the non-aqueous electrolyte solution.

A non-aqueous electrolyte solution in a solid electrolyte layer facilitates lithium ion transfer between an active material and the solid electrolyte. Consequently, a battery with a higher energy density can be achieved.

In addition to a solid electrolyte, a solid electrolyte layer may contain a gel electrolyte or an ionic liquid.

The gel electrolyte may be a polymer material containing a non-aqueous electrolyte solution. The polymer material may be poly(ethylene oxide), polyacrylonitrile, poly(vinylidene difluoride), poly(methyl methacrylate), or a polymer having an ethylene oxide bond.

A cation in the ionic liquid may be an aliphatic chain quaternary salt, such as tetraalkylammonium or tetraalkylphosphonium, an alicyclic ammonium, such as pyrrolidinium, morpholinium, imidazolinium, tetrahydropyrimidinium, piperazinium, or piperidinium, or a nitrogen-containing heterocyclic aromatic cation, such as pyridinium or imidazolium. An anion in the ionic liquid may be $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$. The ionic liquid may contain a lithium salt.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. The lithium salt may be one lithium salt selected from these. Alternatively, the lithium salt may be a mixture of two or more lithium salts selected from these. The concentration of the lithium salt ranges from 0.5 to 2 mol/l, for example.

The battery according to the second embodiment may be of various types, such as a coin type, a cylindrical type, a square or rectangular type, a sheet type, a button type, a flat type, or a layered type.

EXAMPLES

Example 1

[Production of Positive-Electrode Active Material]

LiF, $Li_2O$, $LiMnO_2$, $MnO_2$, and $LiBO_2$ were weighed at a mole ratio of Li/Mn/B/O/F=1.4/1.1/0.1/2.5/0.5.

The raw materials, together with a proper amount of 3-mm zirconia balls, were put in a 45-cc zirconia container, which was then sealed in an argon glove box.

It was removed from the argon glove box and was treated in a planetary ball mill at 600 rpm for 30 hours.

The resulting compound was subjected to X-ray powder diffraction measurement.

FIG. 2 shows the results.

The space group of the compound was Fm-3m.

The composition of the compound was determined by ICP spectroscopy and inert gas fusion-infrared absorption.

The compound had a composition of $Li_{1.4}Mn_{1.1}B_{0.1}O_{2.5}F_{0.5}$.

[Production of Battery]

Next, 70 parts by mass of the compound, 20 parts by mass of an electrically conductive agent, 10 parts by mass of poly(vinylidene difluoride) (PVDF), and a proper amount of 2-methylpyrrolidone (NMP) were mixed to prepare a positive-electrode mixture slurry.

The positive-electrode mixture slurry was applied to one side of a positive-electrode current collector formed of aluminum foil 20 μm in thickness.

The positive-electrode mixture slurry was dried and rolled to form a positive-electrode plate with a positive-electrode active material layer. The positive-electrode plate had a thickness of 60 μm.

A circular positive electrode 12.5 mm in diameter was punched out from the positive-electrode plate.

A circular negative electrode 14.0 mm in diameter was punched out from lithium metal foil 300 μm in thickness.

Fluoroethylene carbonate (FEC), ethylene carbonate (EC), and ethyl methyl carbonate (EMC) were mixed at a volume ratio of 1:1:6 to prepare a non-aqueous solvent.

$LiPF_6$ was dissolved at a concentration of 1.0 mol/l in the non-aqueous solvent to prepare a non-aqueous electrolyte solution.

A separator (manufactured by Celgard, LLC., product number 2320, 25 μm in thickness) was impregnated with the non-aqueous electrolyte solution.

The separator is a 3-layer separator composed of a polypropylene layer, a polyethylene layer, and a polypropylene layer.

A CR2032 coin-type battery was assembled from the positive electrode, the negative electrode, and the separator in a dry box maintained at a dew point of −50° C.

Examples 2 to 28

The Li/Me/A/O/F ratio was changed from those described in Example 1.

Table 1 lists the compositions of the positive-electrode active materials according to Examples 2 to 28.

Except for these, the positive-electrode active materials according to Examples 2 to 28 were synthesized in the same manner as in Example 1.

The space group of the positive-electrode active materials according to Examples 2 to 28 was Fm-3m.

The precursors in Examples 2 to 28 were weighed at the stoichiometric ratio and were mixed in the same manner as in Example 1. For example, in Example 2, LiF, $Li_2O$, $LiMnO_2$, $MnO_2$, and $LiPO_4$ were weighed and mixed.

Coin-type batteries according to Examples 2 to 28 were produced from the positive-electrode active materials according to Examples 2 to 28 in the same manner as in Example 1.

Comparative Example 1

Lithium cobalt oxide ($LiCoO_2$) was produced by a known method.

The space group of the lithium cobalt oxide was R-3m.

The lithium cobalt oxide was used as a positive-electrode active material to assemble a coin-type battery in the same manner as in Example 1.

<Evaluation of Battery Performance>

The electric current density on the positive electrode was set at 0.5 mA/cm², and the battery according to Example 1 was charged to a voltage of 5.2 V.

Subsequently, the discharge cut-off voltage was set at 1.5 V, and the battery according to Example 1 was discharged at an electric current density of 0.5 mA/cm².

The battery according to Example 1 had an initial discharge capacity of 380 mAh/g.

The electric current density on the positive electrode was set at 0.5 mA/cm², and the battery according to Comparative Example 1 was charged to a voltage of 4.3 V.

Subsequently, the discharge cut-off voltage was set at 2.5 V, and the battery according to Comparative Example 2 was discharged at an electric current density of 0.5 mA/cm².

The battery according to Comparative Example 1 had an initial discharge capacity of 145 mAh/g.

The capacities of the coin-type batteries according to Examples 2 to 28 were measured in the same manner as in Example 1.

Table 1 shows the results.

TABLE 1

| | Composition | $x/(y+z)$ | $(x+y+z)/(\alpha+\beta)$ | Initial discharge capacity (mAh/g) |
|---|---|---|---|---|
| Example 1 | $Li_{1.4}Mn_{1.1}B_{0.1}O_{2.5}F_{0.5}$ | 1.17 | 0.87 | 380 |
| Example 2 | $Li_{1.4}Mn_{1.1}P_{0.1}O_{2.5}F_{0.5}$ | 1.17 | 0.87 | 377 |
| Example 3 | $Li_{1.4}Mn_{1.1}Si_{0.1}O_{2.5}F_{0.5}$ | 1.17 | 0.87 | 376 |
| Example 4 | $Li_{1.4}Mn_{1.15}B_{0.05}O_{2.5}F_{0.5}$ | 1.17 | 0.87 | 373 |
| Example 5 | $Li_{1.4}Mn_{1.0}B_{0.2}O_{2.5}F_{0.5}$ | 1.17 | 0.87 | 359 |
| Example 6 | $Li_{1.8}Mn_{0.8}B_{0.1}O_{2.5}F_{0.5}$ | 1.50 | 1.00 | 378 |
| Example 7 | $Li_{2.1}Mn_{0.8}B_{0.1}O_{2.5}F_{0.5}$ | 2.33 | 1.00 | 370 |
| Example 8 | $Li_{1.7}Mn_{1.2}B_{0.1}O_{2.5}F_{0.5}$ | 1.31 | 1.00 | 358 |
| Example 9 | $Li_{1.5}Mn_{1.3}B_{0.1}O_{2.5}F_{0.5}$ | 1.07 | 0.97 | 334 |
| Example 10 | $Li_{1.4}Mn_{1.1}B_{0.1}O_{1.8}F_{1.2}$ | 1.17 | 0.87 | 345 |
| Example 11 | $Li_{1.4}Mn_{1.1}B_{0.1}O_{2.9}F_{0.1}$ | 1.17 | 0.87 | 369 |
| Example 12 | $Li_{1.4}Mn_{1.1}B_{0.1}P_{0.05}O_{2.5}F_{0.5}$ | 1.12 | 0.88 | 374 |
| Example 13 | $Li_{1.4}Ni_{1.1}B_{0.1}O_{2.5}F_{0.5}$ | 1.17 | 0.87 | 262 |
| Example 14 | $Li_{1.4}Co_{1.1}B_{0.1}O_{2.5}F_{0.5}$ | 1.17 | 0.87 | 258 |
| Example 15 | $Li_{1.4}Fe_{1.1}B_{0.1}O_{2.5}F_{0.5}$ | 1.17 | 0.87 | 221 |
| Example 16 | $Li_{1.4}Mn_{1.1}Al_{0.05}B_{0.1}O_{2.5}F_{0.5}$ | 1.12 | 0.88 | 377 |
| Example 17 | $Li_{1.4}Mn_{0.9}Ni_{0.2}B_{0.1}O_{2.5}F_{0.5}$ | 1.17 | 0.87 | 365 |
| Example 18 | $Li_{1.4}Mn_{0.9}Co_{0.2}B_{0.1}O_{2.5}F_{0.5}$ | 1.17 | 0.87 | 359 |
| Example 19 | $Li_{1.4}Mn_{0.9}Cr_{0.2}B_{0.1}O_{2.5}F_{0.5}$ | 1.17 | 0.87 | 361 |
| Example 20 | $Li_{1.4}Mn_{1.0}Cu_{0.1}B_{0.1}O_{2.5}F_{0.5}$ | 1.17 | 0.87 | 358 |
| Example 21 | $Li_{1.4}Mn_{1.0}Mg_{0.1}B_{0.1}O_{2.5}F_{0.5}$ | 1.17 | 0.87 | 355 |
| Example 22 | $Li_{1.4}Mn_{1.0}Ti_{0.1}B_{0.1}O_{2.5}F_{0.5}$ | 1.17 | 0.87 | 354 |

TABLE 1-continued

|  | Composition | x/(y + z) | (x + y + z)/(α + β) | Initial discharge capacity (mAh/g) |
|---|---|---|---|---|
| Example 23 | $Li_{1.4}Mn_{1.0}Mo_{0.1}B_{0.1}O_{2.5}F_{0.5}$ | 1.17 | 0.87 | 349 |
| Example 24 | $Li_{1.4}Mn_{1.0}Zr_{0.1}B_{0.1}O_{2.5}F_{0.5}$ | 1.17 | 0.87 | 369 |
| Example 25 | $Li_{1.4}Mn_{1.0}Zn_{0.1}B_{0.1}O_{2.5}F_{0.5}$ | 1.17 | 0.87 | 366 |
| Example 26 | $Li_{1.4}Mn_{1.0}Nb_{0.1}B_{0.1}O_{2.5}F_{0.5}$ | 1.17 | 0.87 | 368 |
| Example 27 | $Li_{1.4}Mn_{0.9}Ni_{0.1}Co_{0.1}B_{0.1}O_{2.5}F_{0.5}$ | 1.17 | 0.87 | 363 |
| Example 28 | $Li_{1.3}Na_{0.1}Mn_{1.1}B_{0.1}O_{2.5}F_{0.5}$ | 1.00 | 0.87 | 364 |
| Comparative example 1 | $LiCoO_2$ | 1.00 | 1.00 | 145 |

Table 1 shows that the batteries according to Examples 1 to 28 had an initial discharge capacity in the range of 221 to 380 mAh/g.

The batteries according to Examples 1 to 28 had a larger initial discharge capacity than the battery according to Comparative Example 1.

This is probably because Examples 1 to 28 had high covalency, and an element with a low atomic weight (one or two or more elements selected from the group consisting of B, Si, and P) formed solid solution in Examples 1 to 28. This probably increased the discharge operating voltage and initial discharge capacity.

This is also probably because Examples 1 to 28 contain F. The substitution of electronegative F for oxygen improves the operating voltage. Substitution with F, which has a small ionic radius, decreases the interatomic distance and stabilizes the structure. This probably increased the initial discharge capacity.

Table 1 also shows that the batteries according to Examples 2 to 3 and 12 have a smaller initial discharge capacity than the battery according to Example 1.

This is probably because the crystal structure in Examples 2 to 3 and 12 was distorted due to a larger ionic radius of P and Si than B. This probably decreased Li diffusibility and decreased the initial discharge capacity.

Table 1 also shows that the battery according to Example 4 has a smaller initial discharge capacity than the battery according to Example 1.

This is probably because a decreased amount of B to be strongly bonded to oxygen in solid solution in Example 4 reduced the effect of suppressing oxygen desorption during charging and resulted in destabilization of the structure. This probably decreased the initial discharge capacity.

Table 1 also shows that the battery according to Example 5 has a smaller initial discharge capacity than the battery according to Example 1.

This is probably because an increased amount of B not directly involved in charging and discharging resulted in the smaller initial discharge capacity in Example 5.

Table 1 also shows that the batteries according to Examples 6 to 8 have a smaller initial discharge capacity than the battery according to Example 1.

This is probably because the Li content higher than the Mn and B content in Examples 6 to 8 resulted in an uneven distribution of Mn in the structure. This probably decreased the structural stability upon Li deintercalation and decreased the initial discharge capacity.

This is also probably because Examples 6 to 8 did not have a cation-deficient structure (that is, "$(x+y+z)/(α+β)$" is 1), which resulted in insufficient Li diffusion paths and the smaller initial discharge capacity.

Table 1 also shows that the battery according to Example 9 has a smaller initial discharge capacity than the battery according to Example 1.

This is probably because the Li content lower than the Mn and B content in Example 9 resulted in a lower Li content involved in the reaction and the smaller initial discharge capacity.

Table 1 also shows that the battery according to Example 10 has a smaller initial discharge capacity than the battery according to Example 1.

This is probably because an increase in the electronegative F content in Example 10 resulted in lower electronic conductivity and the smaller initial discharge capacity.

Table 1 also shows that the battery according to Example 11 has a smaller initial discharge capacity than the battery according to Example 1.

This is probably because an increased O content in Example 11 resulted in an increased amount of oxygen desorption during charging, which destabilized the structure. This is also probably because a decrease in the F content resulted in a decrease in cation-anion interaction and destabilization of the structure upon Li deintercalation. For these reasons, the initial discharge capacity was probably decreased.

Table 1 also shows that the batteries according to Examples 13 to 15 have a smaller initial discharge capacity than the battery according to Example 1.

This is probably because the substitution of Mn with Me that is less likely to form a hybrid orbital with oxygen than Mn in Examples 13 to 15 increased oxygen desorption during charging. This probably destabilized the structure and decreased the initial discharge capacity.

Table 1 also shows that the batteries according to Examples 16 to 27 have a smaller initial discharge capacity than the battery according to Example 1.

This is probably because the solid solution of Me that is less likely to form a hybrid orbital with oxygen than Mn in Examples 16 to 27 increased oxygen desorption during charging. This probably destabilized the structure and decreased the initial discharge capacity.

Table 1 also shows that the battery according to Example 28 has a smaller initial discharge capacity than the battery according to Example 1.

This is probably due to the presence of Na, which has a large ionic radius, on the Li diffusion path in the crystal structure in Example 28. This probably decreased Li diffusibility and decreased the initial discharge capacity.

A positive-electrode active material according to the present disclosure can be utilized as a positive-electrode active material of batteries, such as secondary batteries.

What is claimed is:

1. A positive-electrode active material comprising a compound represented by a composition formula: $Li_xMe_yA_zO_\alpha F_\beta$, where:
   Me denotes one or more elements selected from the group consisting of Mn, Co, Ni, Fe, Al, Cu, Nb, Mo, Ti, Cr, Zr, Zn, Na, K, Ca, Mg, Pt, Au, Ru, and W;
   A denotes one or more elements selected from the group consisting of B, Si, and P; and
   $1.3 \leq x \leq 2.1$,
   $0.8 \leq y \leq 1.3$,
   $0 \leq z \leq 0.2$,
   $1.8 \leq \alpha \leq 2.9$, and
   $0.1 \leq \beta \leq 1.2$ are satisfied,
   wherein a crystal structure of the compound belongs to a space group FM-3M,
   $1 \leq x/(y+z) \leq 2.33$, and
   $2.6/3 \leq (x+y+z)/(\alpha+\beta) \leq 2.9/3$ are satisfied.

2. The positive-electrode active material according to claim 1, wherein $1.12 \leq x/(y+z) \leq 2.33$ is satisfied.

3. The positive-electrode active material according to claim 1, wherein
   Me denotes one element selected from the group consisting of Mn, Co, Ni, and Fe, or
   Me denotes a solid solution of Mn and one element selected from the group consisting of Co, Ni, Al, Cu, Nb, Mo, Ti, Cr, Zr, Zn, Na, and Mg, or
   Me denotes a solid solution of Ni, Co, and Mn.

4. The positive-electrode active material according to claim 1, wherein $0.05 \leq z \leq 0.2$ is satisfied.

5. The positive-electrode active material according to claim 1, wherein $1.8 \leq \alpha \leq 2.5$ and $0.5 \leq \beta \leq 1.2$ are satisfied.

6. The positive-electrode active material according to claim 1, wherein Me denotes one or more elements selected from the group consisting of Co, Ni, Fe, Al, Cu, Nb, Mo, Ti, Cr, Zr, Zn, Na, K, Ca, Mg, Pt, Au, Ru, and W.

7. A battery comprising:
   a positive electrode containing a positive-electrode active material;
   a negative electrode; and
   an electrolyte, wherein
   the positive-electrode active material comprising a compound represented by a composition formula: $Li_xMe_yA_zO_\alpha F_\beta$, where:
   Me denotes one or more elements selected from the group consisting of Mn, Co, Ni, Fe, Al, Cu, Nb, Mo, Ti, Cr, Zr, Zn, Na, K, Ca, Mg, Pt, Au, Ru, and W;
   A denotes one or more elements selected from the group consisting of B, Si, and P; and
   $1.3 \leq x \leq 2.1$,
   $0.8 \leq y \leq 1.3$,
   $0 \leq z \leq 0.2$,
   $1.8 \leq \alpha \leq 2.9$, and
   $0.1 \leq \beta \leq 1.2$ are satisfied,
   wherein a crystal structure of the compound belongs to a space group FM-3M,
   $1 \leq x/(y+z) \leq 2.33$, and
   $2.6/3 \leq (x+y+z)/(\alpha+\beta) \leq 2.9/3$ are satisfied.

8. The battery according to claim 7, wherein a weight ratio of the compound to the positive-electrode active material is 50% or more and 100% or less.

9. The battery according to claim 7, wherein the negative electrode contains a negative-electrode active material that stores and releases lithium, and the electrolyte is a non-aqueous electrolyte solution.

10. The battery according to claim 7, wherein the negative electrode contains a negative-electrode active material that stores and releases lithium, and the electrolyte is a solid electrolyte.

11. The battery according to claim 7, wherein Me denotes one or more elements selected from the group consisting of Co, Ni, Fe, Al, Cu, Nb, Mo, Ti, Cr, Zr, Zn, Na, K, Ca, Mg, Pt, Au, Ru, and W.

* * * * *